United States Patent [19]
Ona et al.

[11] Patent Number: 5,152,950
[45] Date of Patent: Oct. 6, 1992

[54] BLADDER LUBRICANT COMPOSITION FOR TIRE MOLDING

[75] Inventors: Isao Ona, Kimitsu; Tsutomu Naganawa, Ichibara, both of Japan

[73] Assignee: Dow Corning Toray Silicone Company, Ltd., Tokyo, Japan

[21] Appl. No.: 745,677

[22] Filed: Aug. 16, 1991

Related U.S. Application Data

[62] Division of Ser. No. 521,206, May 9, 1990, Pat. No. 5,073,608.

[30] Foreign Application Priority Data

May 25, 1989 [JP] Japan ................................ 1-32496

[51] Int. Cl.$^5$ ............................................. B29C 35/02
[52] U.S. Cl. ................................. 264/315; 264/338; 528/34; 525/477
[58] Field of Search ......................... 525/477; 528/34; 264/315, 338

[56] References Cited

U.S. PATENT DOCUMENTS

| | | | |
|---|---|---|---|
| 4,387,196 | 6/1983 | Bonnet et al. | 525/477 |
| 4,454,262 | 6/1984 | Fukayama et al. | 523/210 |
| 4,889,770 | 12/1989 | Ona et al. | 428/447 |
| 5,013,800 | 5/1991 | Inoue | 525/477 |

FOREIGN PATENT DOCUMENTS 1161422  1/1984  Canada .
1217293  1/1987  Canada .

Primary Examiner—John C. Bleutge
Assistant Examiner—Margaret W. Glass
Attorney, Agent, or Firm—Alexander Weitz

[57] ABSTRACT

An improved bladder lubricant composition is disclosed which provides durable release of bladders from cured rubber tires in the manufacture of the latter. The composition comprises (A) an organopolysiloxane resin consisting essentially of phenylsilsesquioxane units and dimethylsiloxane units; (B) an organosilane having trioxime or trialkoxy functionality; (C) a condensation catalyst; and, optionally, (D) at least one diorganopolysiloxane having hydroxyl or alkoxy terminal groups.

4 Claims, No Drawings

BLADDER LUBRICANT COMPOSITION FOR TIRE MOLDING

This is a divisional of copending application Ser. No. 07/521,206 filed on May 9, 1990 now U.S. Pat. No. 5,073,608.

This invention concerns a type of bladder lubricant composite for tire molding.

BACKGROUND OF THE INVENTION

Cars, trucks, bicycles, etc., use various types of tires. When these tires are manufactured, a bag called a bladder is usually used.

In this manufacturing method, a bag known as a bladder is first inserted into an uncured tire (raw tire). The bag is then inflated by hot water or steam and the raw tire, with an inflated bladder inserted in it, is set in a mold for heating and curing to form the desired tire molding product. In this method, when the bladder is inflated, a good lubricant property is needed between the interior of the raw tire and the bladder. After curing, when the bladder is shrunk, a good mold releasing property is needed between the bladder and the internal surface of the cured tire. Hence, tests have been conducted to coat a lubricant or a mold release agent on the surface of the bladder. To date, many types of bladder lubricant compositions for tire moldings have been proposed. For example, Canadian Patent No. 1,161,422 proposes a type of lubricant composition made of polydimethylsiloxane, an alkoxysilane compound, and a zinc-family catalyst. However, this lubricant composition has several disadvantages, such as a short operating time (pot life), a weak adherent strength on the bladder, and a poor durability. On the other hand, Canadian Patent No. 1,217,293 and Japanese Kokai Patent No. 57-111393 propose lubricant compositions containing polydimethylsiloxane and polyethylene glycol and/or polypropylene glycol, etc. However, these lubricant compositions also have disadvantages, such as poor heat resistance and poor durability for long-term application.

SUMMARY OF THE INVENTION

In order to solve the disadvantages of these conventional bladder lubricant compositions for tire moldings, the present inventors have performed intensive research. As a result of this research, it was found that when a specified composition is used, it can form rubber by self-crosslinking after evaporation of solvent. At the same time, the composition forms a film that can be reliably bonded to the bladder surface with excellent durability. In this way, the lubrication property with the tire can be attained.

Thus, an object of this invention is to provide a type of bladder lubricant composition for tire moldings characterized by the following features: it has a good lubrication property with uncured tires (raw tires) and, at the same time, has a good mold-releasing property with the cured tires. Additionally, long-term utilization (i.e., durability) is possible. Moreover, when a bladder treated with the bladder lubricant composition of this invention is used for molding tires, not only can the service lifetime of the bladder be prolonged, but the molded tires have no contamination on their surfaces, and there is little exposure of tire cord and little bead bending of the resulting tires. The present invention therefore relates to a type of bladder lubricant composition for tire moldings comprising:

(A) about 50 to 90 weight percent of an organopolysiloxane resin consisting essentially of about 10 to 90 weight percent Ph-SiO$_{3/2}$ siloxane units, in which Ph denotes a phenyl group, and about 90 to 10 weight percent (CH$_3$)$_2$SiO$_{2/2}$ siloxane units;

(B) about 2 to 35 weight percent of an organosilane selected from the group consisting of an organosilane represented by the formula

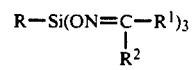

and an organosilane represented by the formula

R-Si(OR$^1$)$_3$ wherein R, R$^1$ and R$^2$ in the above formulas are monovalent hydrocarbon groups;

(C) about 0.1 to 10 weight percent of condensation catalyst; and (D) up to about 30 weight percent of at least one diorganopolysiloxane having terminal groups selected from the group consisting of hydroxyl and alkoxy groups.

DETAILED DESCRIPTION OF THE INVENTION

The organopolysiloxane resin (A) is the major component of the composition of this invention. It is a resin-like organopolysiloxane consisting of about 10 to 90 weight percent of

siloxane units and about 90 to 10 weight percent of (CH$_3$)$_2$SiO$_{2/2}$ siloxane units, there being no special limitation on its molecular weight. Examples of this type of organopolysiloxane resin include condensation products of hydrolyzed chlorosilane represented by

and (CH$_3$)$_2$SiCl$_2$.

Alternatively, the organopolysiloxane resin (A) may be a cohydrolysis condensation product of

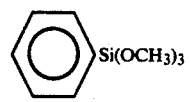

and other phenyltrialkoxysilanes with (CH$_3$)$_2$Si(OCH$_3$)$_2$ and other dimethyldialkoxysilanes. When these organopolysiloxane resins are to be manufactured, it is preferred that the hydrolysis reaction and condensation reaction of said silanes be carried out slowly by adding toluene, xylene, or other nonpolar solvent and a minute amount of water. As explained above, the organopolysiloxane resin results from a hydrolysis reaction and therefore usually contains hydroxyl groups. A part of these hydroxyl groups may be reacted with an alcohol, or with methyltrimethoxysilane, to form alkoxy groups.

The organosilane used as component (B) in this invention is a necessary component for making the composition of this invention bond to the bladder by crosslinking the organopolysiloxane of said component (A). Organosilane (B) is selected from the structures

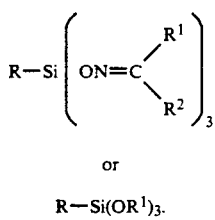

or

R—Si(OR$^1$)$_3$.

In the formulas shown above, R, R1, and R2 are monovalent hydrocarbon groups, such as methyl group, ethyl group, propyl group, and other alkyl groups; vinyl group, allyl group, and other alkenyl groups; etc. Examples of this type of organosiloxane include organosiloxanes having oxime groups, such as methyltris(methylethylketoxime)silane, vinyl-tris(methylethylethoxime)silane, and the like, and organosilanes having alkoxy groups, such as methyltrimethoxysilane, methyltriethoxysilane, vinyltrimethoxysilane, inter alia.

While the proportion of component (A) can be 50 to 90 weight percent, the proportion of component (B) should be about 2 to 35 weight percent, preferably 5 to 20 weight percent. If this proportion is smaller than about 2 weight percent, crosslinking is insufficient for the composition of this invention, causing insufficient adhesion to the bladder. On the other hand, if this proportion is higher than about 35 weight percent, the film becomes too rigid and fragile.

Component (C) used in this invention is a catalyst for the condensation reaction which can promote curing of the composite of this invention. Examples of the catalysts for the condensation reaction include dibutyltin diacetate, dibutyltin dilaurate, dioctyltin dilaurate, dibutyltin dioctoate, zinc naphthenate, cobalt naphthenate, zinc octylate, tin octylate, cobalt octylate, diisooctyl mercaptoacetate, zirconium naphthenate, zirconium octylate, tetrabutyl orthotitanate, and other organic metal catalysts; diethanolamine, triethanolamine, and other amine-family catalysts containing no organic silicon compounds. The proportion of component (C) used should be about 0.1 to 10 weight percent, preferably 0.5 to 5 weight percent.

A diorganopolysiloxane (D) may optionally be added to the composition of the present invention in order to further improve the lubricating property, mold releasing property, and smoothness thereof. This component can be added, depending on the requirements, (e.g., when a higher performance is required). In order for this type of diorganosiloxane to react with component (A) and/or component (B), the two terminals of its molecular chain must have hydroxyl groups or alkoxy groups, such as a methoxy group, ethoxy group, propoxy group, etc. The main chain of the diorganopolysiloxane is usually made of dimethylpolysiloxane. It is also possible to have the methyl groups partially substituted by organoamine groups, such as

—(CH$_2$)$_3$NH(CH$_2$)$_2$NH$_2$

—(CH$_2$)$_3$NH$_2$

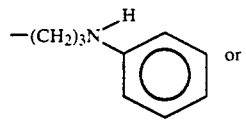

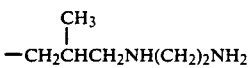

and the like.

While the proportion of component (A) can be 50 to 90 weight percent, the proportion of component (D) should be 0 to about 30 weight percent, preferably 1 to 10 weight percent.

Component (E) used in this invention is a component used for dissolving said components (A) through (D) to facilitate forming a uniform coating on the surface of the bladder. Examples of the solvents that can be used include toluene, xylene, benzene, and other aromatic solvents; n-hexane, n-heptane, a rubber solvent, gasoline for industrial use, and other aliphatic hydrocarbons; carbon tetrachloride, 1,1,1-trichloroethane, perchloroethylene, and other chlorinated solvents. Since this component is used to dissolve components (A) through (D) to facilitate coating on the surface of the bladder for the tire molding, there is no special limit on its proportion. Usually, however, its proportion should be 50 to 90 percent, preferably 70 to 85 percent, based on the total weight of the composition.

If needed, the composition of this invention may also be used with the following additives in addition to said components (A) through (E) as long as the purpose of this invention is not degraded: an organosilane having amino groups, organosilane having epoxy groups, vinyltrimethoxysilane and other organosilanes; dimethylpolysiloxane with its two terminals blocked by trimethylsiloxane groups, a pigment, glass beads, bentonite, and other deglossing agents; mica, talc powder, etc.

The lubricant composition for the tire molding of this invention can be very easily applied to the bladder for the tire molding operation. Coating of the composition onto the bladder for tire molding may be performed with a spray, brush, or other means, followed by ambient drying or by heating to dry and cure the coating.

The lubricant composition of this invention can be used for molding tires for vehicles, such as bicycles, motorcycles, tractors, airplanes, cars, pickups, trucks and buses. It can be used for any tire types, such as bias tires and radial tires, inter alia.

EXAMPLES

In the following, this invention will be explained with reference to application examples. In these application examples, "%" refers to "weight %," and the viscosity refers to the value at 25° C.

Application Example 1

A mixture was prepared from the following components: (A) 65.4% of an organopolysiloxane resin containing silanol groups made of 57% of (CH$_3$)$_2$SiO units and 43% of

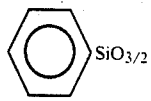

units which was prepared by equilibrating a dimethylpolysiloxane with a viscosity of 80 centistokes with an organopolysiloxane resin made of

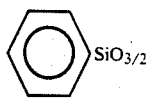

units obtained by the hydrolysis of phenyltrichlorosilane; (B) 27.4% of methyltrimethoxysilane; (C) 0.6% of a dibutyltin dilaurate catalyst; and (D) 6.6% of a methylpolysiloxane containing amino groups having its two terminals blocked by hydroxyl groups and represented by

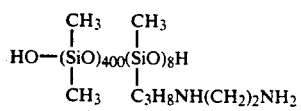

The mixture was diluted with a four fold amount of toluene to form a lubricant composition. The lubricant composition was then uniformly sprayed onto the surface of a butyl rubber bladder which was wiped beforehand. The coated bladder was allowed to dry for 20 hours. Afterwards, a heat treatment was performed at 170° C. for 30 min. In this case, observation of the surface of the bladder made of butyl rubber indicated that the coated lubricant composition was cured to form a rubber-like layer strongly bonded onto the surface of the bladder.

This bladder was used in the repeated molding of radial tires for cars by curing tires in a BAG-OMATIC curing machine. It was found that up to 23 tires could be well molded without using an internal paint (bond-ply lubricant or green inner paint). For the 24th tire and later, the mold-releasing property was degraded. However, after the lubricant composition for the bladder was applied again, molding could be continued for 22 more tires.

For the purpose of comparison, a tire molding test was performed in the same way as above except that a 20% solution of trimethylsiloxy endblocked dimethylpolysiloxane (viscosity=350 centistokes) in toluene was prepared and used in place of said lubricant composition. It was found that, in this case, only 3 tires could be molded.

Application Example 2

A mixture made of 61.8% of the same type of organopolysiloxane resin as that used in Application Example 1, 25.8% of methyl-tris(methylethylketoxime)silane, 6.2% of the same type of methylpolysiloxane, containing amino groups and having its two terminals blocked by hydroxyl groups, as that used in Application Example 1, 5.6% of dimethylpolysiloxane having a viscosity of 4000 centistokes and represented by HO[(CH$_3$)$_2$SiO]$_{400}$H, and 0.6% of a dibutyltin dioctoate catalyst was diluted with a three fold amount of xylene to form a bladder lubricant composition for a tire molding containing 75% of the solvent.

The performance of the obtained lubricant composition was then measured in the same way as in Application Example 1. It was found that the film of the lubricant composition was glossy and strongly bonded onto the surface of the bladder. When this bladder was used in molding tires as in Application Example 1, 26 tires could be molded, with a good mold-releasing property of the tires produced from the mold.

Application Example 3

A mixture made of 69.0% of the same type of organopolysiloxane resin as that used in Application Example 1, 28.8% of vinyl-tris(methylethylketoxime)silane, 1.6% of dimethlpolysiloxane with a viscosity of 10,000 centistokes and having its two terminals blocked by trimethylsiloxy groups, 0.3% of dibutyltin diacetate, and 0.3% of zinc octoate catalyst was diluted by a four fold amount of solvent mixture made of 50% of n-heptane and 50% of toluene, to a bladder lubricant composition.

The performance of the lubricant composition was measured in the same way as in Application Example 1. It was found that the film formed from this composition was strongly bonded onto the surface of the bladder.

The bladder was used to mold tires in the same way as in Application Example 1. It was found that up to 21 tires could be molded.

We claim:

1. In a method for forming a cured rubber tire by heating an uncured rubber tire within the confines of a mold, wherein a rubber bladder coated with a lubricant is first inserted into said uncured rubber tire and then inflated during said heating, the improvement comprising using as said lubricant a composition consisting essentially of:
   (A) about 50 to 90 weight percent of an organopolysiloxane resin consisting essentially of about 10 to 90 weight percent Ph—SiO$_{3/2}$ siloxane units, in which Ph denotes a phenyl group, and about 90 to 10 weight percent (CH$_3$)$_2$SiO$_{2/2}$ siloxane units;
   (B) about 2 to 35 weight percent of an organosilane selected from the group consisting of an organosilane represented by the formula

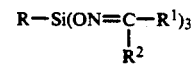

and an organosilane represented by the formula

wherein R, R$^1$ and R$^2$ in the above formulas are monovalent hydrocarbon groups;
   (C) about 0.1 to 10 weight percent of a condensation catalyst; and
   (D) from about 1 to 10 weight percent of at least one diorganopolysiloxane having terminal groups selected from the group consisting of hydroxyl and alkoxy groups.

2. The method according to claim 1, wherein R, R$^1$ and R$^2$ of said organosilane (B) are each selected from the group consisting of alkyl radicals having from 1 to 3 carbon atoms.

3. The method according to claim 2, wherein said diorganopolysiloxane (D) is selected from the group consisting of polydimethylsiloxane and polydimethylsiloxane in which the methyl groups are partially substituted by organoamine groups.

4. The method according to claim 3, wherein R and R$^1$ are each a methyl radical.

* * * * *